United States Patent [19]
Soergel

[11] 3,711,141
[45] Jan. 16, 1973

[54] BAG HOLDER
[76] Inventor: Loren G. Soergel, 1011 Michigan Avenue, South Haven, Mich. 49101
[22] Filed: Aug. 17, 1970
[21] Appl. No.: 64,493

[52] U.S. Cl. ............... 294/55, 15/257.8, 56/400.13, 294/19 R
[51] Int. Cl. ............................................. A47f 13/08
[58] Field of Search............294/1, 49, 51, 52, 57, 59; 15/257.1, 257.4, 257.5, 257.7, 257.8; 56/400.09, 400.11, 400.14, 400.15; 248/95, 97, 99, 100, 101

[56] References Cited

UNITED STATES PATENTS

| | | | |
|---|---|---|---|
| 3,281,178 | 10/1966 | Fisher | 294/1 R |
| 3,017,653 | 1/1962 | Bird | 15/257.8 |
| 2,710,196 | 6/1955 | Larson | 280/36 C |
| 2,652,680 | 9/1953 | Adams | 56/400.11 |
| 2,995,329 | 8/1961 | Talcott | 248/97 |

Primary Examiner—Evon C. Blunk
Assistant Examiner—Johnny D. Cherry
Attorney—Woodhams, Blanchard and Flynn

[57] ABSTRACT

A device for holding open the mouth of a flexible receptacle, particularly a large plastic bag, for enabling the bag to be filled with grass, leaves or the like. The holding device includes a loop-like frame having a substantially D-shaped configuration and adapted to be disposed within the mouth of a bag for holding same open. The frame has a plurality of small projections which are adapted to engage the free edge of the bag. An elongated handle is secured to the frame and extends upwardly from the curved portion thereof for enabling the frame to be disposed in a substantially vertical position with the lower straight portion of the frame being disposed adjacent the ground. A pair of legs are fixedly secured to and extend rearwardly of the straight portion of the frame for enabling the frame, when a bag is disposed thereon, to be vertically supported on the ground whereby leaves and the like can be pushed directly into the open mouth of the bag.

6 Claims, 4 Drawing Figures

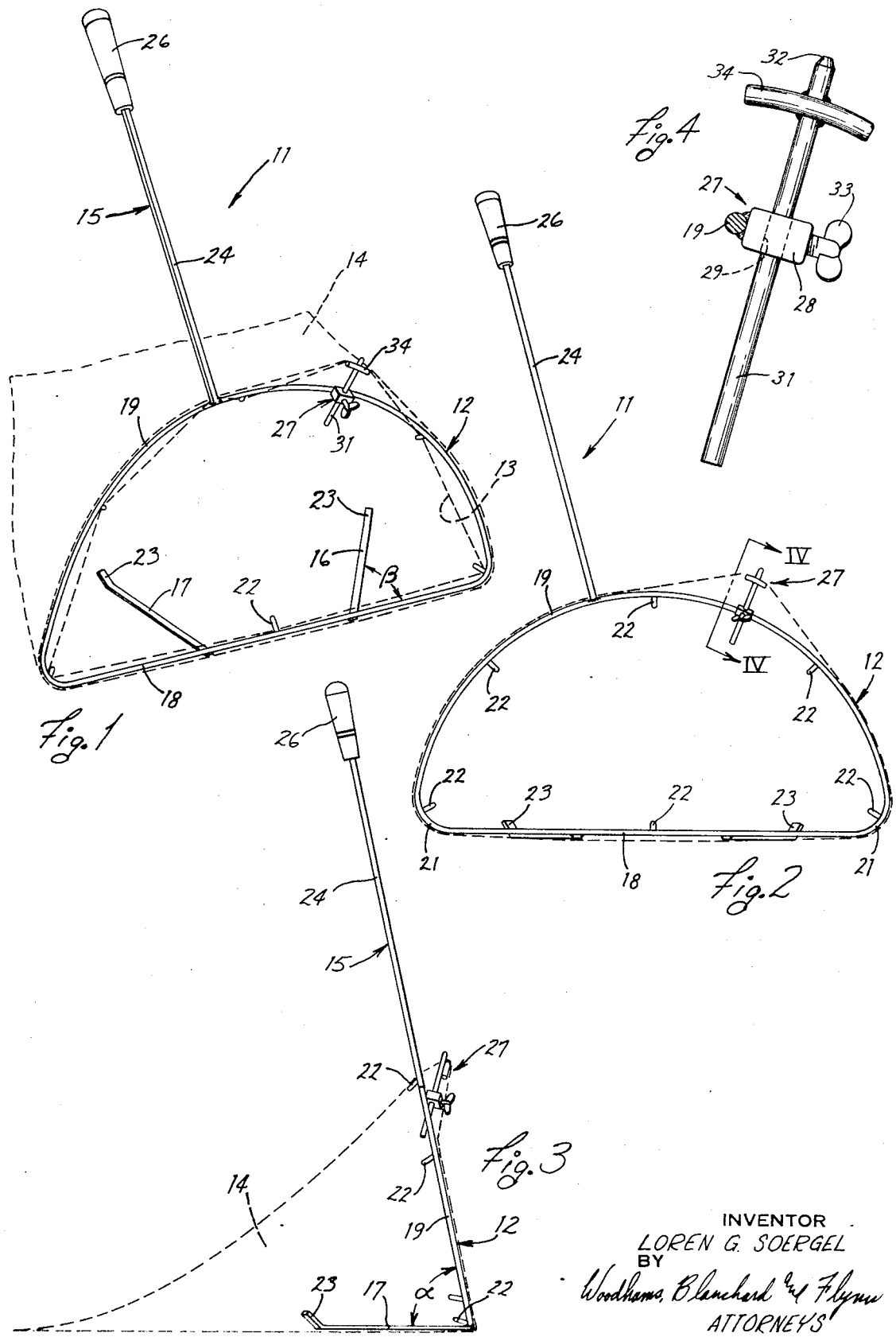

BAG HOLDER

FIELD OF THE INVENTION

This invention relates to an improved device for holding open the mouth of a flexible bag or receptacle and, in particular, to a device capable of being disposed directly on a support surface with the opened mouth of the bag being directly adjacent the support surface so that leaves, grass or the like can be pushed directly into the interior of the bag.

BACKGROUND OF THE INVENTION

Collecting and discarding leaves, grass trimmings and the like has long presented a problem which, in part, has been minimized by the wide scale use of large plastic bags, which bags are economical to use and can be easily disposed of. Plastic bags for collecting and disposing of leaves and grass trimmings have been used by homeowners and the like on a substantially wide scale for a substantial number of years. While these bags have provided a convenient means for storing leaves and other disposable trash, nevertheless the use of such plastic bags has in itself created additional problems, particularly as regards filling the bags, due to the flexibility and inherent weakness of the bags.

Users of plastic bags have, for a substantial period of time, been confronted with the problem of how to easily fill the bags, such as with leaves, grass trimmings or the like. The bags are extremely flexible and thus trash can be deposited into the bags only by having some means for holding the bag open, such as by suspending the plastic bag within a large metal can or drum. While this procedure does provide adequate support for the bag, nevertheless this procedure is undesirable since it requires that all of the trash be manually lifted so as to be deposited into the bag.

Accordingly, it is an object of the present invention to provide a bag holding device which can be inserted into the mouth of a bag, particularly a plastic bag, for holding open the mouth of the bag to enable trash, such as leaves or grass, to be easily inserted into the bag without the user physically handling the trash.

Specifically, it is an object of the present invention to provide a bag holder device, as aforesaid, which can be utilized for holding open the mouth of a bag while at the same time enabling the bag to be positioned on the ground with the mouth being disposed adjacent the ground when in the open position whereby the trash, such as leaves or grass, can be raked or pushed directly into the bag.

A further object of the present invention is to provide an improved bag holding device, as aforesaid, which can be easily and economically manufactured, which is durable and long lasting, which is easy and efficient to use, and which requires very little storage space.

Other objects and purposes of this present invention will be apparent to persons acquainted with devices of this type upon reading the following specification and inspecting the accompanying drawings.

BRIEF DESCRIPTION OF THE DRAWINGS

FIG. 1 is a perspective view of a bag holding device constructed according to the present invention, same being illustrated with a bag attached thereto, the bag being illustrated in dotted lines.

FIG. 2 is a front view of the bag holder illustrated in FIG. 1.

FIG. 3 is a side view of the bag holder illustrated in FIG. 1.

FIG. 4 is an enlarged view of the adjusting mechanism, as taken along the line IV—IV of FIG. 2.

Certain terminology will be used in the following description for convenience in reference only and will not be limiting. The words "upwardly", "downwardly", "rightwardly" and "leftwardly" will refer to directions in the drawings to which reference is made. The words "inwardly" and "outwardly" will refer to directions toward and away from, respectively, the geometric center of the device and designated parts thereof. This terminology will include the words above specifically mentioned, derivatives thereof and words of similar import.

SUMMARY OF THE INVENTION

The objects and purposes of the present invention are met by providing a bag holding device which includes a loop-like frame having a substantially D-shaped configuration, the D-shaped frame being adapted to be disposed within the mouth of a flexible bag for holding the mouth of the bag open. The D-shaped frame includes a substantially straight base portion and also includes an arcuate portion having a substantially semicircular shape, the opposite ends of the arcuate portion being fixedly connected to the opposite ends of the straight portion. The D-shaped frame is preferably provided with a plurality of small rearwardly extending lugs thereon adapted to engage the edge of the bag surrounding the opening therein for securely coupling the bag to the holder device. At least one leg is fixedly secured to the base portion of the frame and extends rearwardly therefrom for permitting the D-shaped frame to stand upwardly in a substantially vertical direction when the frame is deposited on the ground, the frame being supported by the base portion and the rearwardly extending leg so that the bag is thus positioned adjacent the ground with the mouth of the bag being held open. The holder device also includes an elongated handle which is fixedly secured to the arcuate portion of the frame and extends upwardly therefrom, the handle preferably lying within the same plane as the D-shaped frame and being slightly angularly offset to one side of the frame for enabling a user of the device to grip the handle with one hand while enabling the user to manipulate a rake or other tool with the other hand for inserting leaves or the like into the open mouth of the bag. Alternately, the user can use both hands to manipulate the rake or tool since the rearwardly extending leg will maintain the holder device in a stable upright position. The D-shaped frame also preferably has an adjustment device mounted on the arcuate portion thereof, which adjustment device is adapted for engaging the free edge of the bag. The adjustment device is selectively movable outwardly relative to the arcuate portion of the frame to enable the holder device to accommodate bags having different sized openings.

DETAILED DESCRIPTION

FIGS. 1–3 illustrate therein a bag holder 11 constructed according to the present invention, which holder 11 includes a loop-like frame 12 having a substantially D-shaped configuration. The D-shaped frame 12 is adapted to be disposed within the mouth or opening 13 of a flexible bag 14 for holding the mouth of the bag in the open position. The holder 11 also includes an upwardly extending handle 15 and one or more rearwardly extending legs 16 and 17.

The D-shaped frame 12 specifically includes an elongated straight base portion 18 and an arcuate portion 19, which arcuate portion 19 preferably approximates a semicircle. The opposite ends of the arcuate portion 19 are fixedly, here integrally, connected to the opposite ends of the straight base portion 18 by means of curved transition portions 21.

The D-shaped frame 12, as described above, thus essentially comprises an endless loop-like member which is free of sharp corners, whereupon the frame 12 can thus be inserted into the mouth 13 of a flexible plastic bag 14.

The D-shaped frame 12 is preferably provided with a plurality of rearwardly extending, bag-engaging lugs 22 thereon. The lugs 22 are fixedly connected to the frame 12 and extend both rearwardly and inwardly relative to the plane of the frame 12 and relative to the opening defined thereby. The lugs 22 are preferably substantially uniformly spaced around the frame 12, with at least one lug being provided adjacent each transition portion 21 and additional lugs being provided on the base portion 18 and the arcuate portion 19, at least substantially at the midpoints thereof, whereupon the lugs 22 are thus positioned for engaging the free edge of the bag 14 so as to hold open the mouth 13 of the bag.

The legs 16 and 17 are each fixedly connected to the base portion 18 and extend rearwardly relative to the plane of the D-shaped frame 12 at an angle which approaches but is preferably slightly less than 90°. Particularly, the legs 16 and 17 extend at an angle $\alpha$ (FIG. 3) relative to the plane of the frame 12, the angle $\alpha$ being within the range of between 60° and 85° and preferably approximately 80°. The legs 16 and 17 thus permit the D-shaped frame 12 to extend upwardly in a substantially vertical direction while at the same time providing the necessary stability for preventing the frame from easily tipping over.

The legs 16 and 17 also preferably diverge outwardly relative to one another as illustrated in FIG. 1 so as to provide additional lateral stability. The legs 16 and 17 preferably individually extend at an angle $\beta$ of approximately 60° relative to the longitudinal direction of the base portion 18. The free ends or tips 23 of the legs are preferable bent upwardly so as to prevent the ends of the legs from catching or tearing the plastic bag.

Considering now the handle assembly 15, same comprises an elongated rod-like member 24 having the lower end thereof fixedly connected to the arcuate portion 19. The upper end of the rod portion 24 is provided with a grip portion 26 secured thereto. As illustrated in FIG. 3, the handle 15 is preferably disposed within the same plane as the D-shaped frame 12. However, as illustrated in FIG. 2, the lower end of the rod-like member 24 is preferably connected to the arcuate portion 19 at a location which is slightly laterally offset from the midpoint thereof, with the rod portion 24 also extending upwardly at a slight angle relative to the vertical direction so that the grip portion 26 will be laterally offset so as to be disposed closely adjacent, but vertically spaced above, one end of the base portion 18. The lateral offset and angularity of the handle 15 thus permits a user of the device to stand adjacent one side of the holder, particularly when a bag is mounted thereon, while additionally enabling the user to easily manually grasp the grip portion 26 while standing adjacent one side of the holder.

To enable the holder 11 to accommodate bags 14 having different sized openings 13 therein, the holder 11 is additionally provided with an adjusting device 27 disposed for engaging the free edge of the bag so as to compensate for different sized openings. The adjusting device 27 specifically includes a block 28 fixedly secured to the arcuate portion 19, preferably adjacent the upper part of the arcuate portion as illustrated in FIG. 2. The block 28 is provided with an opening 29 therethrough, in which is slidably received an adjustable lug member 31, which lug member 31 comprises an elongated rod. The upper end 32 of rod 31 is preferably partially pointed so as to enable it to grippingly engage the free edge of the bag 14. The adjustable lug 31 is disposed for movement in a direction substantially radially relative to the arcuate portion 19. The lug 31 is fixedly maintained in a selected position by means of a thumb screw 33. Lug 31 is prevented from inadvertently slipping out of the block 28 by means of an arcuate projection 34 secured to the rod 31 adjacent the upper end thereof, the projection 34 acting as a stop for limiting the inward (downward in FIG. 2) movement of the rod 31. The projection 34 also keeps the bag from slipping down over the complete extended length of the lug 31 after the upper end 32 of lug 31 has engaged the free edge of the bag 14.

OPERATION

When it is desired to utilize the holder 11, the D-shaped frame 12 is inserted into the mouth 13 of the bag 14, whereupon the free edge of the bag is then wrapped around the arcuate portion 19 and around the base portion 18 so that the free edge of the bag will engage the lugs 22, which lugs may be used for penetrating the edge of the bag, if desired, so as to firmly connect the bag to the holder 11. The adjusting device 27 is preferably positioned so that the pointed end 32 of the lug 31 will also engage or penetrate the free edge of the bag 14, the lug 31 being positioned so that the projection 34 will engage the free edge of the bag whereby substantially all slack will be removed from the free edge of the bag so that the bag will not be inadvertently dislodged or disconnected from the holder 11. When in this assembled condition, the legs 16 and 17 extend into the interior of the bag substantially as illustrated in FIG. 3.

When it is desired to utilize the device 11 with the bag 14 connected thereto, same is positioned on a support surface, such as the ground, substantially in the manner as illustrated in FIG. 3, the D-shaped frame 12 being supported in a substantially vertical position by means of the legs 16 and 17. However, since the frame 12 extends at an angle of slightly less than 90° relative to the support surface, as defined by the legs 16 and 17, the holder 11 will thus be supported on the ground in a stable manner and will not easily tip over.

With the holder 11 positioned as illustrated in FIG. 1, in which position the base portion 18 is disposed adjacent the ground so that the open mouth of the bag extends along the ground for a substantial distance, the user of the device can then easily insert leaves, grass or the like into the bag merely by pushing the leaves through the open mouth of the bag. This latter operation can be performed by positioning the holder with the bag thereon in the position illustrated in FIG. 3, the holder being disposed closely adjacent a pile of leaves or trash which is disposed on the ground. The user of the device, while standing adjacent one side of the holder, will then place one hand on the grip portion 26, whereupon the other hand can then be used to manipulate a rake or other tool for pushing the pile of leaves directly into the open mouth of the bag. Alternately, the user can use both hands to manipulate the rake or tool since the rearwardly extending leg will maintain the holder device in a stable upright position. The specific D-shaped frame 12 thus provides a desirable configuration since it permits the open mouth of the bag to be disposed closely adjacent the ground with the mouth extending along the ground for a substantial distance so that the leaves or grass can be raked or pushed directly into the bag without requiring that the leaves be lifted from the ground.

After the bag 14 has been filled with leaves, grass or the like, then the free edge of the bag can be manually disengaged from the lugs 22 and removed from the holder 11, whereupon the bag can then be tied and disposed of in whatever manner desired.

The holder 11 may be easily and economically constructed from metal rod of circular cross section. For example, the handle portion 24 and the D-shaped frame 12 can be easily and economically bent from a single piece of rod while requiring only a single spot weld for forming the D-shaped portion. The handle portion 24 can be formed from one end of a straight metal rod, whereupon the D-shaped portion 12 can then be integrally bent so as to be formed adjacent the other end of the metal rod, with the other free end of the metal rod comprising a part of the arcuate portion 19 such that the free end of the bent portion of the metal rod will thus terminate adjacent the lower end of the handle portion 24, that is, adjacent the point where the handle 24 connects to the arcuate portion 18, which junction point will then be spot welded so as to form the D-shaped frame 12 as an endless loop.

The holder 11 may also be constructed of plastics, such as by being molded in one piece, thereby permitting the holder 11 to be easily manufactured. The D-shaped frame 12 and the handle 24 are also preferably constructed with a circular, rod-like cross-sectional configuration so as to eliminate any sharp corners or edges which might make mounting or removal of the bag more difficult. Further, while the disclosed embodiment utilizes a pair of legs 16 and 17, it will be recognized that the present invention could also be accomplished by utilizing only a single rearwardly extending leg. However, a pair of legs is preferred since this provides additional lateral stability.

In one preferred embodiment of the invention, the base portion 18 is preferably provided with a length of approximately 24 inches, and the D-shaped frame 12 has a vertical height of approximately 13 inches. This configuration is particularly suitable for use with commercially available plastic bags which have a size of 20 gallons up to 6 bushels capacity. However, the exact size and dimensions of the D-shaped frame can obviously be selected so as to accommodate the sizes of bags which are commercially available.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which I claim an exclusive property or privilege are defined as follows:

1. A device for releasably engaging the free edge of a flexible disposable bag for holding open the mouth thereof, said device comprising:
   frame means for engaging the free edge of said disposable bag for holding open the mouth of the bag, said frame means comprising an endless rodlike member having a looplike configuration disposed within a single plane, said endless rodlike member engaging the free edge of said bag and including an elongated substantially straight portion and a substantially semi-circular arcuate portion having the opposite ends thereof fixedly connected to the opposite ends of said straight portion;
   gripping means provided on said endless rodlike member for releasably engaging the free edge of said bag, said gripping means including a plurality of projections fixedly secured to and spaced around the periphery of said endless looplike member, at least some of said projections being fixedly secured to both said straight portion and said arcuate portion;
   elongated handle means fixedly secured to the arcuate portion of said endless rodlike member at a point thereon spaced from said straight portion; and
   leg means fixedly secured to the straight portion of said endless rodlike member, said leg means extending outwardly at a substantial angle relative to the plane of said endless rodlike member for enabling said looplike member to extend upwardly at least partially in the vertical direction when said leg means is disposed within a substantially horizontal plane, said leg means and said straight portion both extending within and defining a common plane which is disposed at a substantial angle relative to the plane of the endless member.

2. A device according to claim 1, wherein said leg means includes a pair of spaced substantially straight leg members fixedly connected to said straight portion at locations spaced inwardly from the ends of said straight portion, said leg members having a length substantially less than the length of said straight portion and diverging outwardly relative to one another in a direction away from said straight portion, and said leg members extending at an angle of between approximately 60° and 85° relative to the plane of said endless looplike member.

3. A device according to claim 1, wherein at least some of said projections project transversely relative to the plane of said loop-like member and radially inwardly relative to the interior of said loop-like member for engaging the free edge of a bag.

4. A device according to claim 1, wherein said elongated handle means comprises an elongated rodlike member having one end thereof fixedly secured to the arcuate portion of said endless member at a point positioned adjacent to but slightly laterally offset from the midpoint thereof, and said rodlike handle and said endless rodlike member and said leg means all being fixedly and integrally interconnected so as to constitute one piece.

5. A device for releasably engaging the free edge of a flexible disposable bag or receptacle for holding open the mouth thereof, said device comprising:

frame means adapted to cooperate with the free edge of a disposable bag for holding open the mouth of the bag, said frame means comprising an endless rodlike member having a looplike configuration, said endless rodlike member including an elongated substantially straight portion;

gripping means provided on said endless rodlike member for releasably engaging the free edge of said bag, said gripping means including a plurality of projections fixedly secured to and spaced around the periphery of said endless looplike member;

elongated handle means fixedly secured to said endless rodlike member at a point thereon spaced from said straight portion;

leg means fixedly secured to the straight portion of said endless rodlike member, said leg means extending outwardly at a substantial angle relative to the plane of said endless rodlike member for enabling said looplike member to extend upwardly at least partially in the vertical direction when said leg means is disposed within a substantially horizontal plane; and adjustable gripping means adjustably mounted on said endless looplike member for enabling said device to be adjusted so as to accommodate bags having different sized openings, said adjustable gripping means including a selectively movable gripping member having a gripping portion spaced radially outwardly of said looplike member and disposed for gripping engagement with the free edge of a bag, and mounting means coacting between said gripping member and said endless looplike member for permitting said gripping member to be selectively moved radially relative to said looplike member and fixedly locked to said looplike member in a selective position.

6. A device according to claim 5, wherein said endless rod-like member includes an arcuate portion having the opposite ends thereof fixedly connected to the opposite ends of said straight portion;

said gripping member having an elongated rod-like portion extending substantially radially outwardly of said arcuate portion in a direction away from said straight portion, said rod-like portion having a transverse support portion fixedly secured thereto adjacent the outer free end thereof, said support portion being slightly spaced from the free end of said rod-like portion to enable said free end to penetrate the free edge of a bag with said bag being supported on said transverse support portion; and said arcuate portion of said endless rod-like member having mounting means thereon for slidably receiving therein said elongated rod-like portion, and threaded fastening means coacting between said mounting means and said rod-like portion for permitting said rod-like portion to be fixedly secured in a selective position.

* * * * *